United States Patent
Ammedick-Naumann et al.

(10) Patent No.: US 6,254,918 B1
(45) Date of Patent: *Jul. 3, 2001

(54) SAUCE AID

(75) Inventors: Claudia Ammedick-Naumann, Wüstenrot; Klaus Bezner, Untergruppenback-Unterheinriet; Hans Bohrmann, Talheim; Jürgen Carl, Heilbronn-Neckargartach, all of (DE)

(73) Assignee: CPC International, Inc., Englewood Cliffs, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,678

(22) Filed: Oct. 7, 1997

(30) Foreign Application Priority Data

Oct. 8, 1996 (DE) .............................................. 196 41 416

(51) Int. Cl.[7] ..................................................... A23L 1/238
(52) U.S. Cl. ........................................... 426/589; 426/549
(58) Field of Search ................................... 426/549, 578, 426/589, 602, 603

(56) References Cited

U.S. PATENT DOCUMENTS

| | | | |
|---|---|---|---|
| 3,021,222 | * | 2/1962 | Kerr et al. ............................ 426/578 |
| 4,134,901 | * | 1/1979 | van den Ouweland et al. . 260/323.3 |
| 4,139,699 | * | 2/1979 | Hernandez et al. .................. 536/109 |
| 4,418,090 | | 11/1983 | Bohrmann et al. .................. 426/578 |
| 4,568,551 | | 2/1986 | Seewi et al. ........................... 426/99 |
| 4,612,197 | | 9/1986 | Postner .................................. 426/47 |
| 4,671,966 | | 6/1987 | Giddey et al. . |
| 5,008,124 | * | 4/1991 | Wilson ................................. 426/589 |
| 5,229,157 | | 7/1993 | Birch et al. . |
| 5,492,715 | | 2/1996 | Greenland et al. .................. 426/658 |

FOREIGN PATENT DOCUMENTS

| | | |
|---|---|---|
| 26 51 791 | 5/1997 | (DE) . |
| 0229938 | 3/1989 | (EP) . |
| 0835 614 A3 | 6/1998 | (EP) . |
| 2 239 586 | 11/1990 | (GB) . |
| 97 01619 | 7/1997 | (HU) . |
| 60075255 | 9/1993 | (JP) . |
| PCT/DK91/00109 | 4/1991 | (WO) . |

OTHER PUBLICATIONS

*Lebensmittel–Lexicon* (Encyclopedia of Foodstuffs), Leipzig, p. 176 [entry for "Curry Powder"] and p. 758 entries for "Sauce, Ready for Cooking, Not Sweet, Dry Sauce, Sauce Concentrate, Sauce Extract, Dry Sauce Concentrate, Canned Sauce, Dry" and "Sauce Powder", 1981.

Passmore, Jacki and Reid, Daniel P; *The Complete Chinese Cookbook;*, Lansdown Press (Australia), excerpt regarding "Sweet and Sour Sauce", 1982.

Antolini, Piero and Tjo, The Lian; *The Great Book of Chinese Cooking*; Crown Publishers, Inc., excerpt regarding recipe for "Pork With Mu Xi", 1990.

Szechuan Cooking; Highlight International Co., Ltd.; excerpt regarding recipe for "Stir–Fried Beef Shreds with Fish–Flavored Sauce".

* cited by examiner

*Primary Examiner*—Milton Cano
*Assistant Examiner*—Hao Mai
(74) *Attorney, Agent, or Firm*—Norris, McLaughlin & Marcus

(57) ABSTRACT

A semifluid, binding foodstuff composition which can be used as an aid in making food products such as sauces. The composition is an oil-in-water emulsion of a food grade oil, water, ungelatinized starch and a finely divided vegetable powder or fruit powder containing cell wall and/or fiber. The composition is used to thicken food products and contributes seasoning, coloring or both seasoning and coloring to food products, particularly sauces.

5 Claims, No Drawings

SAUCE AID

BACKGROUND OF THE INVENTION

1. Field of the Invention

The invention relates to a semifluid, in particular pasty, seasoning and/or coloring, binding foodstuff which can be used as a sauce aid. The foodstuff of the invention comprises an oil-in-water emulsion and includes ungelatinized starch and a vegetable powder or fruit powder.

2. Description of Related Art

A semifluid, seasoning and/or coloring foodstuff is desired which can be used, for example, for producing sauces. There is the problem in this case of avoiding the settling of the spices or coloring constituents which are generally not completely soluble in water or in oil. On the one hand, a stable oil-in-water emulsion is desired for products of this type, but on the other hand the conjoint use of emulsifiers is undesired. In order to guarantee problem-free use, the product should not be crumb-like or powdery, but rather should have a smooth texture.

Dry products, as are disclosed, for example, in DE-A 29 30 664 and which comprise, for example, starch as thickener, fat powders and flavorings, such as onion powder and tomato powder are consequently unsuitable for this purpose.

German Patent 32 43 963 discloses lump-free hot-dispersible base dry products for bound sauces and soups which are produced from starch material and edible fat and can include finely comminuted vegetables, in particular onions, carrots, leek and/or celery. These products are produced by heating the starch material together with the edible fat, with addition of extra water.

A process for producing food additives in agglomerated form with conjoint use of emulsifiers and gelatinized starch is disclosed in EP 229 938.

EP 166 284 describes a sauce enhancer in tubes which is based on cream, egg yolk, liquid butterfat fraction and milk derivatives, to which starch derivatives, in particular slightly cross-linked potato starches, can be added as thickeners. Native starches are said to be less suitable for this use because of their tendency to form a skin.

SUMMARY OF THE INVENTION

The present invention relates to a semifluid, seasoning and/or coloring, binding foodstuff comprising an oil-in-water emulsion including ungelatinized starch and a vegetable powder or fruit powder in a finely divided form containing cell wall and/or fiber. The ungelatinized starch and vegetable powder or fruit powder are not completely soluble in the water phase.

DETAILED DESCRIPTION OF THE INVENTION

Vegetable powders or fruit powders which are suitable are, in particular, a vegetable concentrate, pea flour, lentil flour, tomato puree, garlic powder, paprika powder, onion powder, mushroom powder, asparagus powder or apple concentrate. The content of the vegetable powder or fruit powder in the foodstuff of the invention is generally 10–50% by weight, preferably 15–35% by weight.

The starch must be an ungelatinized starch. Starches derived from wheat, corn and other farinaceous materials can be used and potato starch is preferred. Preferably, the starch is a starch given a moist heat treatment under the conditions described in U.S. Pat. No. 4,568,551, the disclosure of which is incorporated herein by reference. The content of starch is generally 1–40% by weight, preferably 5–30% by weight.

The foodstuff of the invention generally contains 1–40% by weight, preferably 5–20% by weight, of an oil suitable as a foodstuff and 2–40% by weight, preferably 5–30% by weight, of water. Various food grade oils are suitable, including corn oil, olive oil, soybean oil and the like. In a particularly preferred embodiment, the foodstuff of the invention has an $A_w$ of 0.6–0.8. $A_w$ is an abbreviation for water activity, which is the equilibrium moisture over the product in percent atmospheric moisture.

Ungelatinized starch is a constituent which has a tendency to sedimentation. In dilute emulsion, starch would always settle. On the other hand, water is required as dissolving constituent for numerous flavorings and as a constituent which keeps the consistency of the emulsion low so that the pourability is ensured. The conventional stabilization principles used for emulsions or suspensions fail for a complex system of this type. Emulsifiers only stabilize the oil emulsion and do not prevent starch sedimentation. Increasing the viscosity or density to prevent sedimentation not only of the starch but also of the seasoning constituents is not possible to the required extent without off-taste and losses of other functionally necessary properties.

Surprisingly, it has been found that numerous vegetable powders and fruit powders present in a finely divided form containing cell wall and/or fiber give the desired properties. According to the invention, a complex system is created in which starch granules and oil droplets are present and also free water in the interstitial spaces, the consistency of the product nevertheless remaining sufficiently low and nevertheless no sedimentation of the ungelatinized starch occurring. Furthermore, the emulsion has a surprising stability and oiling-off of the fat phase has not been observed.

The foodstuff of the invention is suitable, in particular, for use as a sauce aid. Gelatinization of the starch does not occur until the stable emulsion of the invention is poured into water and heated. Accordingly, the foodstuff can be used to thicken foods such as sauces and soups and provide flavoring and/or coloring components.

Use of starch given a moist heat treatment is particularly expedient. This is a non-gelatinized starch, which does not bind immediately and can therefore be easily processed. Native starches, in contrast, tend additionally to bind rapidly and give a slimy structure. Modified starches gelatinize in this system immediately on stirring into boiling water and form lumps.

The invention is described in more detail with reference to the examples below. All percentages are by weight.

EXAMPLES

The constituents mentioned in the examples below, except for the starch and the oil, are mixed and, preferably, in order to keep the microbial content of the products as low as possible, heated for 10 minutes at 80° C. After cooling to at least 40° C., the starch and the oil are stirred in and the mass is homogenized, for example in a colloid mill.

Example 1

30.00% soy sauce
8.00% roast vegetable extract
6.00% tomato puree
8.00% yeast extract 3.00% common salt
3.00% glutamate
1.00% sugar
1.00% onion powder
1.00% mushroom powder
0.50% garlic powder
0.10% ground pepper
0.40% paprika powder
0.10% celery seed
5.00% water
23.00% starch
9.90% oil Example 2

29.00% soy sauce
7.70% roast vegetable extract
7.70% yeast extract
4.80% tomato puree, triple concentrated
3.00% salt
3.00% glutamate
1.00% meat extract
1.20% mushroom powder
0.20% onion extract
1.50% sugar
0.10% ground white pepper
0.40% paprika powder
0.40% garlic powder
30.00% starch
10.00% oil Example 3

15.00% seasoning
10.00% yeast extract
5.00% salt
3.00% glutamate
20.00% vegetable extracts
5.00% spice
27.00% starch
15.00% oil

What is claimed is:

1. A semifluid, binding foodstuff composition for seasoning, coloring or seasoning and coloring consisting essentially of 5% to 20% of a food grade oil, 5% to 30% water, 1% to 23% ungelatinized starch, and 15% to 35% of a vegetable and/or fruit powder in finely divided form containing cell wall and/or fiber and no emulsifiers, said composition having an oil-in-water emulsion and having starch granules and oil droplets with free water in the interstitial spaces and no sediment of said ungelatinized starch.

2. The composition of claim 1, wherein the vegetable powder or fruit powder is a vegetable concentrate, pea flour, lentil flour, tomato puree, garlic powder, paprika powder, mushroom powder, asparagus powder or apple concentrate.

3. The composition of claim 1, wherein the starch has been heat treated under moist conditions.

4. The composition of claim 1, having an $A_w$ of 0.6–0.8.

5. The composition of claim 1 in the form of a paste.

* * * * *